(12) United States Patent
Sakurai et al.

(10) Patent No.: US 6,728,242 B2
(45) Date of Patent: *Apr. 27, 2004

(54) ATM CELL SWITCHING SYSTEM

(75) Inventors: Yoshito Sakurai, Yokohama (JP);
Kenichi Ohtsuki, Kanagawa-Ken (JP);
Shinobu Gohara, Yokohama (JP);
Makoto Mori, Yokohama (JP); Akira Horiki, Yokohama (JP); Takao Kato, Yokohama (JP); Hiroshi Kuwahara, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/374,998

(22) Filed: Feb. 28, 2003

(65) Prior Publication Data

US 2003/0123440 A1 Jul. 3, 2003

Related U.S. Application Data

(63) Continuation of application No. 09/804,225, filed on Mar. 13, 2001, now Pat. No. 6,546,011, which is a continuation of application No. 09/228,748, filed on Jan. 12, 1999, now Pat. No. 6,285,675, which is a continuation of application No. 08/462,269, filed on Jun. 5, 1995, now Pat. No. 6,016,317, which is a continuation of application No. 08/306,978, filed on Sep. 16, 1994, now Pat. No. 5,799,014, which is a continuation of application No. 07/845,668, filed on Mar. 4, 1992, now Pat. No. 5,365,519.

(30) Foreign Application Priority Data

Mar. 5, 1991 (JP) ............................................. 3-038388

(51) Int. Cl.[7] .............................................. H04L 12/56
(52) U.S. Cl. ........................ 370/391; 370/398; 370/535
(58) Field of Search ................................. 370/537, 538, 370/543, 545, 391, 398, 535, 366, 389, 395.1, 428

(56) References Cited

U.S. PATENT DOCUMENTS 3,796,835 A    3/1974  Closs et al. .................... 370/60

(List continued on next page.)

FOREIGN PATENT DOCUMENTS

DE    3513083    10/1986

(List continued on next page.)

OTHER PUBLICATIONS

A Shared Buffer Memory Switch for an ATM Exchange, Kuwahara et al, pp. (4.4.1)–(4.4.5), Sep. 1989.

(List continued on next page.)

*Primary Examiner*—Kenneth Vanderpuye
(74) *Attorney, Agent, or Firm*—Antonelli, Terry, Stout & Kraus, LLP

(57) ABSTRACT

An ATM switching system comprises a switch unit including a plurality of input ports and a plurality of output ports having the same cell transmission rate, and a multiplexer for multiplexing cell trains outputted from at least two output ports into a single cell train and outputting the cell train to a high-speed output line (and/or a demultiplexer for demultiplexing a cell train from an output port into a plurality of cell trains and outputting the cell trains to a plurality of low-speed output lines). The switch unit includes a buffer memory for temporarily storing cells inputted from the input ports while forming a queue chain for each output line to which each cell is to be outputted, a demultiplexer for distributing the cells read from the buffer memory among the output ports in circulation, and a buffer memory control circuit for controlling the write and read operation of cells with the shared buffer memory. The buffer memory control circuit has a control table device for outputting an identifier of an output line to which the cells read from the shared buffer memory are to be outputted, and cells are read from the chain designated by the output line identifier outputted from the control table device.

6 Claims, 11 Drawing Sheets

U.S. PATENT DOCUMENTS

| | | |
|---|---|---|
| 3,979,733 A | 9/1976 | Fraser |
| 4,213,178 A | 7/1980 | Diez et al. ................... 364/200 |
| 4,249,253 A | 2/1981 | Gentile et al. ............. 371/40.3 |
| 4,408,326 A | 10/1983 | Takeuchi et al. ........... 371/40.3 |
| 4,455,648 A | 6/1984 | Binz |
| 4,542,498 A | 9/1985 | Bodros |
| 4,603,416 A | 7/1986 | Servel et al. .................. 370/60 |
| 4,617,660 A | 10/1986 | Sokomoto .................. 371/40.2 |
| 4,630,258 A | 12/1986 | McMillen et al. ............ 370/60 |
| 4,757,440 A | 7/1988 | Scheuneman ............... 364/200 |
| 4,771,419 A | 9/1988 | Graves et al. ................. 370/60 |
| 4,796,254 A | 1/1989 | Van Baardwijk et al. |
| 4,819,226 A | 4/1989 | Beckner et al. ............... 370/60 |
| 4,864,560 A | 9/1989 | Quinquis et al. .......... 370/94.1 |
| 4,875,206 A | 10/1989 | Nichols et al. ........... 370/85.15 |
| 4,884,264 A | 11/1989 | Servel et al. .................. 370/60 |
| 4,891,803 A | 1/1990 | Huang et al. ................ 370/411 |
| 4,905,225 A | 2/1990 | Francois et al. .............. 370/60 |
| 4,910,731 A | 3/1990 | Sakurai et al. ................ 370/67 |
| 4,933,846 A | 6/1990 | Humphrey et al. ........ 370/85.1 |
| 4,933,932 A | 6/1990 | Quinquis et al. ............. 370/60 |
| 4,939,720 A | 7/1990 | Bakka ......................... 370/60 |
| 4,947,388 A | 8/1990 | Kuwahara et al. .......... 370/411 |
| 4,956,839 A | 9/1990 | Toru et al. .................... 370/60 |
| 4,993,024 A | 2/1991 | Quinquis et al. ............. 370/84 |
| 5,101,404 A | 3/1992 | Kudimoto et al. ............ 370/60 |
| 5,124,977 A | 6/1992 | Kozaki et al. ................. 370/60 |
| 5,127,002 A | 6/1992 | Shaik et al. ................ 370/94.1 |
| 5,128,929 A | 7/1992 | Kobayashi ................. 370/94.1 |
| 5,168,498 A | 12/1992 | Adams et al. |
| 5,184,346 A | 2/1993 | Kozaki et al. ................. 370/60 |
| 5,233,603 A | 8/1993 | Takeuchi et al. .............. 370/60 |
| 5,280,475 A | 1/1994 | Yanagi et al. ................. 370/60 |
| 5,287,349 A | 2/1994 | Hyodo et al. ............... 370/399 |
| 5,331,671 A | 7/1994 | Urbansky ................... 375/118 |
| 5,359,605 A | 10/1994 | Urbansky |
| 5,365,519 A | 11/1994 | Kozaki et al. ................. 370/60 |
| 5,412,648 A | 5/1995 | Fan ............................ 370/414 |
| 5,477,549 A | 12/1995 | Kamagata et al. ............ 370/60 |
| 5,572,522 A | 11/1996 | Calamvokis et al. ....... 370/390 |
| 5,577,037 A | 11/1996 | Takatori et al. ............. 370/411 |
| 5,799,014 A | 8/1998 | Kozaki et al. ............... 370/395 |
| 5,838,677 A | 11/1998 | Kozaki et al. ............... 370/389 |
| 6,016,317 A | 1/2000 | Sakurai et al. .............. 370/391 |
| 6,091,709 A | 7/2000 | Harrison et al. ............. 370/411 |
| 6,285,675 B1 | 9/2001 | Sakurai et al. |

FOREIGN PATENT DOCUMENTS

| | | |
|---|---|---|
| EP | 0201252 | 11/1986 |
| EP | 0299473 | 1/1989 |
| EP | 0336373 | 10/1989 |
| EP | 0338558 | 10/1989 |
| FR | 2472245 | 6/1981 |
| FR | 2526613 | 11/1983 |
| FR | 2549373 | 1/1985 |
| FR | 0300876 | 1/1989 |
| GB | 2090680 | 7/1982 |
| JP | 5897944 | 12/1981 |
| JP | 56196495 | 12/1981 |
| JP | 6364439 | 3/1988 |
| JP | 0299473 | 1/1989 |
| JP | 2121549 | 5/1990 |
| JP | 59135994 | 9/1994 |
| WO | 8504776 | 10/1985 |

OTHER PUBLICATIONS

International Switching Symposium 1990, "Innovations in Switching Technology", vol. 5, Jun. 1990, Koinuma et al, Jun. 1990, pp. 21–26.

"A Study of an Integrated Line/Packet Message Channel" Exchanged Division 1832 National General Conference 1988.

Akimaru "Outline of Current Exchange Engineering" Ohm, 1979, pp. 136–137.

C. Clos, A Study of Non Blocking Networks, Bell System Technical Journal, vol. 32, No. 3, 1953.

Switching and Fair Control of Congested Flow in Broadband Networks, Karvenio, pp. 1315–1326, Oct. 1987.

Proceedings of the 15th Annual International Symposium on Computer Architecture, "High Performance Multi–Queue Buffers for VLSI Communication Switches", Y. Tamir et al, May 30 to Jun. 2, 1988, Honolulu, HI.

Arrangement Method of Shared Buffer Type ATM Switching LSI, by Kosaki et al, Technical Report of the Institute of Electronics and Communication Engineers of Japan, pp. 49–54, Feb. 1990.

Line Setting Method of ATM Switching Network, by Shigesada et al, Technical Report of the Institute of Electronics and Communication Engineers of Japan, pp. 31–36, Jan. 1990.

| | c0 | c1 | c2 | c3 | c4 | c5 | c6 | c7 | c8 | c9 | c10 | c11 | c12 | c13 | c14 | c15 |
|---|---|---|---|---|---|---|---|---|---|---|---|---|---|---|---|---|
| COUNT VALUE | | | | | | | | | | | | | | | | |
| VP | VP4 | VP4 | VP2 | VP4 | VP0 | VP1 | VP2 | VP3 | VP0 | VP5 | VP5 | VP3 | VP0 | VP1 | VP2 | VP3 |
| END | O | O | – | – | – | – | – | – | – | O | – | – | – | – | – | – |
| M: MULTICAST<br>N: NOT MULTICAST | M | M | N | M | N | N | N | N | N | M | M | N | N | N | N | N |

104A  
104B  
104C  
104D

ATM CELL SWITCHING SYSTEM

This application is a continuation of application Ser. No. 09/804,225, filed Mar. 13, 2001 now U.S. Pat. No. 6,546, 011; which is a continuation of application Ser. No. 09/228, 748, filed Jan. 12, 1999, now U.S. Pat. No. 6,285,675; which is a continuation of application Ser. No. 08/462,269, filed Jun. 5, 1995, now U.S. Pat. No. 6,016,317; which is a continuation of application Ser. No. 08/306,978, filed Sep. 16, 1994, now U.S. Pat. No. 5,799,014; which is a continuation of application Ser. No. 07/845,668, filed Mar. 4, 1992, now U.S. Pat. No. 5,365,519 which is the subject of Reissue application Ser. No. 08/430,802, filed Apr. 26, 1995, now RE 36,751; and which is a Continuation-in-Part of application Ser. No. 07/482,090, filed Feb. 20, 1990, now U.S. Pat. No. 5,124,977; which is the subject of Reissue application Ser. No. 08/430,809, filed Apr. 26, 1995; now RE 36,716; and which is a Continuation-in-Part of application Ser. No. 07/218,217, filed Jul. 13, 1988 which issued as U.S. Pat. No. 4,910,731; which reissued as Reissue Pat. No. RE 34,305; said application Ser. No. 07/845,668, filed Mar. 4, 1992, now U.S. Pat. No. 5,365,519 is a continuation-in-part of application Ser. No. 07/745,466, filed Aug. 14, 1991, now U.S. Pat. No. 5,280,475, the disclosures of which are incorporated herein by reference.

CROSS-REFERENCES TO RELATED APPLICATIONS

This application relates to U.S. application Ser. No. 07/564,617, filed Aug. 9, 1990 entitled "SWITCHING SYSTEM" the contents of which are incorporated herein by reference.

BACKGROUND OF THE INVENTION

The present invention relates to a switching system, or more in particular to an ATM (Asynchronous Transfer Mode) switching system used with the speech path equipment of a wide-bandwidth ISDN exchange and, especially, an ATM switching system suitable for accommodating a plurality of types of input-output links having different transmission rates.

A "TDM Switching System" proposed by JP-A-59-135994 is known, for example, as an ATM switching system applied to the wide-bandwidth ISDN exchange.

This switching system comprises a multiplexer for multiplexing a fixed-length packet (hereinafter referred to as "the cell") inputted from each input line, a buffer memory for inputting a multiplexed cell, a demultiplexer for periodically separating the cells outputted from the buffer memory among output lines, and a buffer memory control circuit for controlling the buffer memory for each output line.

The Buffer Memory control circuit, which includes FIFO (First In First Out) memories corresponding to the output lines, inputs a write address for the buffer memory into a FIFO memory corresponding to the cell output destination judged from the header information of a cell when the cell is written into the buffer memory. Also, the cell output from the buffer memory corresponding to each output line is produced at predetermined time intervals so that a read address is outputted to the buffer memory from the FIFO memory corresponding to each output line in timing with the cell output.

According to the above-mentioned prior art, the reading of a cell from the buffer memory is controlled to a predetermined timing for each output line. When an attempt is made to accommodate a plurality of types of output links (output lines) different in transmission rate in a switching system having the above-mentioned configuration, therefore, the problem is posed of a very complicated hardware configuration of the buffer memory control circuit.

A packet switching system capable of accommodating a plurality of types of input/output links having different transmission rates is proposed in JP-A-63-64439, for example, as a system for controlling the write and read operations of a packet with a buffer memory using a control memory.

In the above-mentioned packet switching system, a plurality of input and output ports of a switch unit are matched one to one with input and output lines respectively, and packets are inputted and outputted to these input/output ports at a rate equal to the data transmission rate of the input/output lines connected thereto.

In order to realize this switching operation, according to the prior art, the number of an input line providing an objective of the packet write process or an output line providing an objective of the packet read process within a predetermined regular time interval and the R/W designated data are stored in the control memory according to the processing sequence in such a manner as to generate the R/W process at a frequency corresponding to the data transmission rate of each line. The contents (the line numbers and the R/W designated data) of the control memory are sequentially read with the counter output value as an address and packets are written into or read from the buffer memory for the input/output lines designated by the line number thus read out.

More specifically, the switching system described above is such that the buffer memory access is sequentially controlled in such a manner that packets are processed at the switching unit input port (or switch unit output port) connected to a high-speed input line (or output line) at a higher frequency than at the switch unit input port (or switch unit output port) connected to a low-speed input line (or output line).

SUMMARY OF THE INVENTION

An object of the present invention is to provide an ATM switching system capable of a cell switching operation in accordance with the cell transmission rate of an output line to be accommodated.

Another object of the present invention is to provide an ATM switching system which can accommodate output lines of a plurality of different transmission rates including, say, 600 Mbps, 150 Mbps and 50 Mbps with a comparative freedom.

In order to achieve the above-mentioned objects, an ATM switching system according to the present invention comprises a switch unit including a plurality of switch unit input ports and switch unit output ports having a first transmission rate respectively, a plurality of input lines (input links), a plurality of output lines (output links), and at least one conversion means inserted between at least one of the output lines and at least one of the switch unit output ports and having a second transmission rate different from the first transmission rate for converting a cell train of the first transmission rate into a cell train of the second transmission rate. The switch unit includes multiplexing means for multiplexing and outputting a plurality of cell trains inputted from the switch unit input ports as a cell train, a shared buffer memory for temporarily storing the cell trains outputted sequentially from the multiplexer means, demultiplexing means for distributing in circulation the cells read from the shared-buffer memory among the switch unit output ports, and a buffer memory control circuit for controlling the write and read operations of cells from the shared buffer memory; and the buffer memory control circuit includes control table means for outputting an identifier of the output line required to output a cell read from the shared buffer memory in accordance with the cell output timing to the switch unit output port, write means the cell train outputted from the multiplexing means into the buffer memory in such a manner as to form a cue chain of cells for each output line required to be outputted thereby, and read means for reading the cells from the cue chain in the shared buffer memory in accordance with the output line identifier read sequentially from the control table means.

According to the switching system described above, at least one conversion means for converting an input cell train into a cell train of the first trans-mission rate may be connected between at least one of the input lines having a transmission rate different from the first transmission rate and at least one of the switch unit input ports.

In an ATM switching system according to the present invention, assuming that the internal links connected to the output ports of the switch unit are set to the same transmission rate and that the output cells from the internal output links are bundled together by a multiplexer (a kind of conversion means), for example, the cell transmission rate at the output lines connected to the multiplexer can be increased. On the other hand, the output cell from an internal output link may be distributed among a plurality of output lines by a demultiplexer (a kind of conversion means) thereby to reduce the cell transmission rate at each output line. Assuming that a quadruple multiplexer is installed for an internal output link having a transmission rate of 150 Mbps, for example, it is possible to realize an output line having a transmission rate of 600 Mbps. Also, an output line having a transmission rate of 50 Mbps is realized by providing a demultiplexer of three divisions.

In this case, the technical task is how to control the buffer by a buffer memory control circuit. According to the present invention, the above-mentioned multiplexer or demultiplexer is installed at the output port side of the ATM switching unit and the cell queue chain access is controlled in accordance with the output line (output link) connected to the multiplexer or demultiplexer respectively. The above-mentioned control table means has stored therein an output line identifier corresponding to the timing of cell output to the switch unit output ports. According to a counter value, for instance, a switch unit output port is selected and a table addressed sequentially in circulation, so that in timing with the cell output to each output port, the output line identifier for specifying a queue chain to which the cell to be outputted to the particular output port belongs is read from a control table thereby to read a cell from the queue chain.

According to the present invention, the output ports of the switch unit are set to the same cell transmission rate and a new speed change means (multiplexer or demultiplexer) is added between the output port and the output link or is replaced with other appropriate means in accordance with the transmission rate required by the output link thereby to enable comparatively free selection of cell transmission rate on each output line. In this case, with regard to the control system of the ATM switching system, the contents of the control table are simply modified by external microcomputer control or the like means. Thus the transmission rate of the output lines can be easily changed.

The foregoing and other objects, advantages, manner of operation, and novel features of the present invention will be understood from the following detailed description when read in conjunction with the accompanying drawings.

BRIEF DESCRIPTION OF THE DRAWINGS

FIG. 8 is a diagram showing the relationship between a counter value and various values stored in a bandwidth control table having the multicast function.

DESCRIPTION OF THE PREFERRED EMBODIMENTS

An ATM switching system for the bandwidth ISDN (Integrated Services Digital Network) according to an embodiment of the present invention will be described below with reference to the accompanying drawings.

Figure 1:
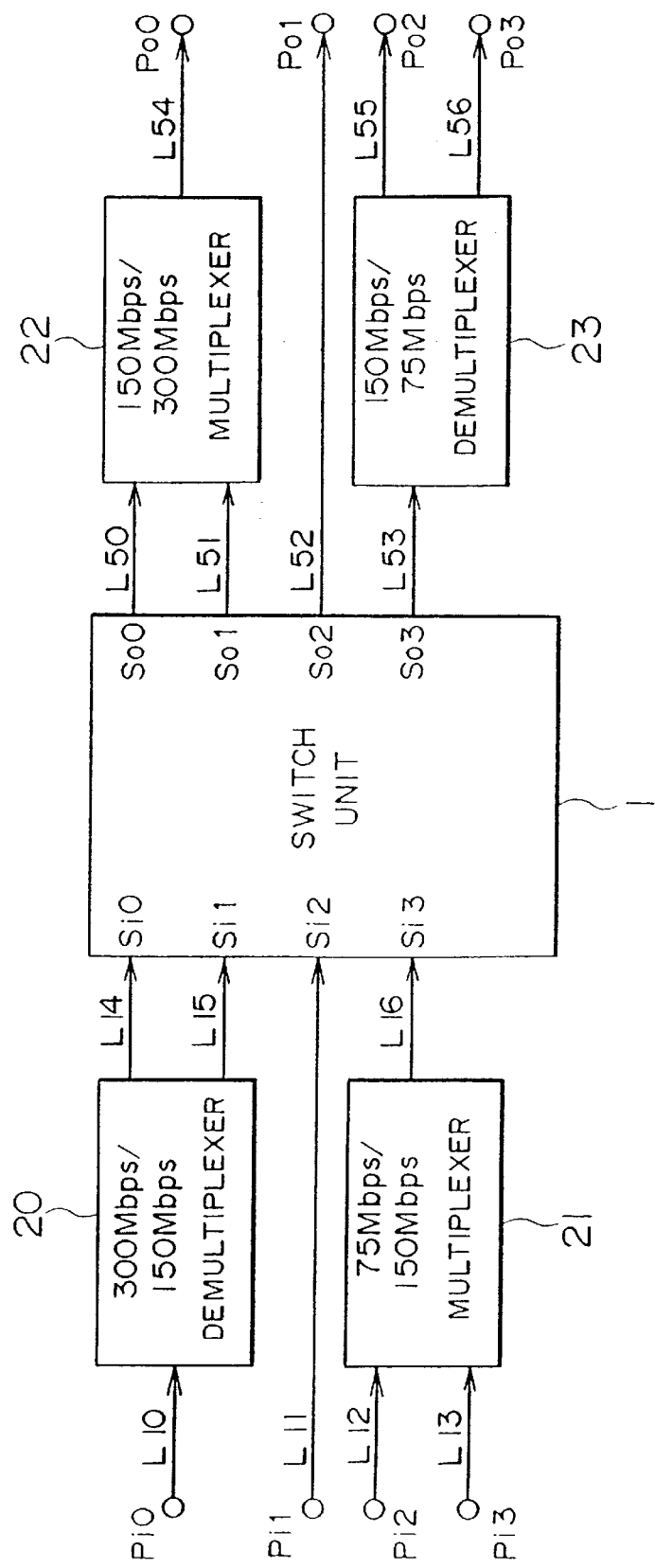
FIG. 1 is a diagram showing a configuration of a switching system having multiple-speed input-output port according to an embodiment of the present invention.

FIG. 1 shows an example of configuration of an ATM switch comprising a pair of line input/output ports (PiO, PoO) connected with a line having the transmission rate of 300 Mbps, a pair of line input/output ports (Pil, Pol) connected with a line of 150 Mbps and two pairs of line input/output ports (Pi2/Po2, Pi3/Po3) connected with a line of 75 Mbps.

In FIG. 1, reference numeral 1 designates a switch unit including switch unit input ports Si0 to Si3 connected respectively with internal input links (L14, L15, L11, L16) having a transmission rate of 150 Mbps and switch unit output ports So0 to So3 connected respectively with internal output links (L50 to L53) of 150 Mbps. Numeral 20 designates a 300 Mbps/150 Mbps, demultiplexer connected between the internal input ports Si0, Sil and the line input port Pi0, and numeral 21 a 75 Mbps/150 Mbps multiplexer inserted between the internal input port Si3 and the line input ports Pi2, Pi3. Numeral 22 designates a 150 Mbps/300 Mbps multiplexer connected between the internal output ports So0, So1 and the line output port Po0, and numeral 23 a 150 Mbps/75 Mbps demultiplexer connected between the internal output port So3 and the line output ports Po2, Po3.

In this switching system, a cell train inputted from the line input port Pi0 through the internal input link L10 at a transmission rate of 300 Mbps is distributed alternately between the internal input links L14 and L15 at the demultiplexer of 300 Mbps/150 Mbps, and the resulting two cell trains having a transmission rate of 150 Mbps are inputted to the switch unit 1. The cell train of 150 Mbps inputted from the line input port Pi1 is inputted to the switch unit 1 directly without being converted in speed. The two cell trains of 75 Mbps inputted through the internal input links L12, L13 from the line input ports Pi2, Pi3, on the other hand, are multiplexed alternately on the internal input link L16 at the multiplexer 21 of 75 Mbps/150 Mbps, and the resulting single cell train having a transmission rate of 150 Mbps is inputted to the switch unit 1.

At the output side of the switch unit 1, each cell train outputted to the internal output links L50, L51 is multiplexed alternately at the multiplexer of 150 Mbps/300 Mbps, and is outputted as a cell train having a transmission rate of 300 Mbps through the internal output link L54 to the line output port Po0. Each cell outputted to the internal output link L52 is outputted from the line output port Po1 at the same speed of 150 Mbps. Each cell outputted to the internal output link L53 is distributed alternately between the internal output links L55 and L56 at the demultiplexer 22 of 150 Mbps/75 Mbps, and is outputted to the line output ports Po2, Po3 respectively at a rate of 75 Mbps.

The internal links of the line input/output ports Pi0 to Pi3 and Po0 to Po3 have installed therein line interfaces for rewriting the cell header, although not shown in FIG. 1 for the sake of simplicity. The functions of the demultiplexers 20, 23 and the multiplexers 21, 22 may be integrated with the line interface.

Figure 2:
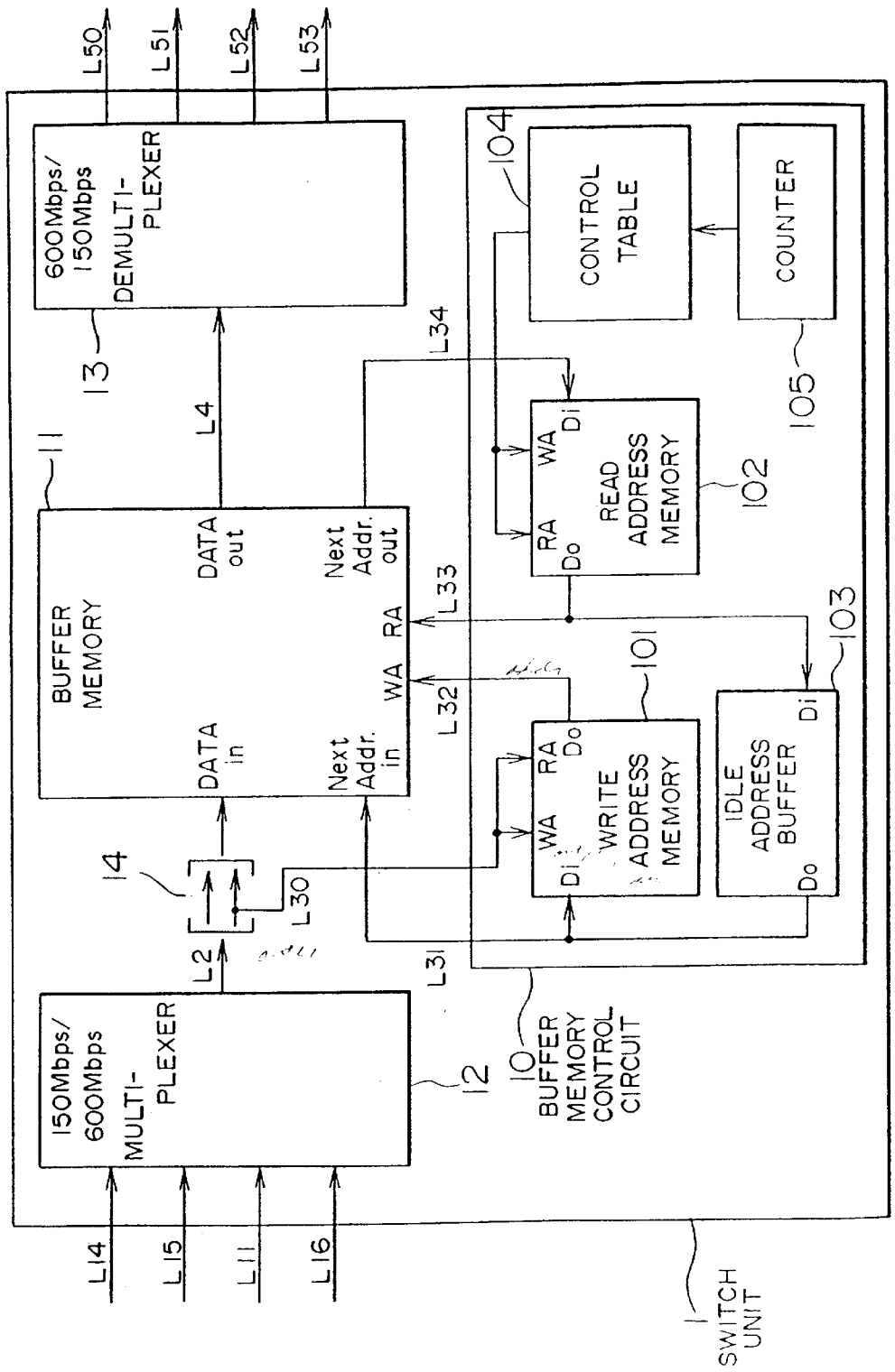
FIG. 2 is a diagram showing a configuration of a switching system comprising a bandwidth control table according to an embodiment of the present invention.

FIG. 2 shows an example of configuration of the switch unit 1. The switch unit 1 includes a multiplexer 12 of 150 Mbps/600 Mbps connected with the switch unit input ports Si0 to Si3 (or the internal input links L11, L14 to L16), a shared buffer memory 11 for temporarily storing the cells inputted sequentially through the port-designating information extraction circuit 14 and the line L2 from the multiplexer 12, a demultiplexer 13 of 600 Mbps/150 Mbps connected to the switch unit output ports So0 to So3 (or the internal output links L50 to L53), and a buffer memory control circuit 10. The buffer memory control circuit 10 includes a write address memory 101, a read address memory 102, an idle address buffer 103, a control table 104 and a counter 105.

The cells inputted to the switch unit 1 at a transmission rate of 150 Mbps through the internal input links L14, L15, L11 and L16 are multiplexed sequentially at the multiplexer 12 of 150 Mbps/600 Mbps and are inputted to the shared buffer memory 11 at a rate of 600 Mbps. The cell of 600 Mbps outputted from the shared buffer memory 11 by the buffer memory control circuit 10, on the other hand, is demultiplexed sequentially among the switch unit output ports So0 to So3 at the 600 Mbps/150 Mbps demultiplexer 13 and is distributively outputted to the internal output links L50 to L53 of 150 Mbps.

The buffer memory control circuit 10 for controlling the write and read operations of the shared buffer memory 11 receives the line output port-designating information from the extraction circuit 14 through the line L30 during the time of writing cells into the shared buffer memory 11, and makes access to the write address memory 101 with the same information as an address. The address which is thus read from the write address memory 101 is applied to the write address WA of the shared buffer memory 11 through the line L32. In the process, an idle address is outputted to the line L31 from an idle address buffer 103 storing idle addresses not in use at the shared buffer memory 11, and is written as "the next address" in the shared buffer memory 11 and the write address memory 101. This next address (idle address) is written in the memory position of the same address as the one wherefrom the write address has been read at the write address memory 101. Also, in the shared buffer memory 11, the next address mentioned above is written in a memory region specified by the same address as the input cell. This next address is indicative of the cell address of the shared buffer memory to be written the next time which is outputted to the same line output port as the input cell, whereby a queue chain for each output line is formed.

During the cell read period, the line identifier is outputted from the control table 104 in accordance with the switch unit output port selected by the demultiplexer 13, and the line identifier is used to designate a queue chain to be accessed for reading in the buffer memory 11. More specifically, the line identifier outputted from the control table 104 is applied as a read address RA and a write address WA to the read address memory 102, and a cell address in a queue chain is outputted to the line L33. On the basis of this address, the next address is read out of the shared buffer memory 11 together with a cell in the queue chain. The next address is stored in an address position corresponding to the line identifier in the read address memory 102 so that the cell to be read the next time from the queue chain may be specified.

Specifically, an address chain (linked list) due to the next address is configured for each line output port. By the way, each queue chain is expanded by a cell each time of writing a cell into the shared buffer memory 11.

More specifically, the reading operation of cells from the shared buffer memory 11 is controlled in a manner that will be mentioned. The counter 105 counts up each time of reading a cell from the shared buffer memory 11. A count value changing in circulation is outputted from the counter 105 and is applied as an address to the control table 104. The control table 104 in turn outputs a line identifier (line output port-specifying information) stored at the storage position in accordance with the count value. This line identifier is applied to the read address memory 102 as a read/write address. During the cell read operation, the above-mentioned address causes a read address to be read out on the line L33 for reading a cell from a specified queue chain corresponding to the line output port in the shared buffer memory 11 from the read address memory 102. By accessing the shared buffer memory 11 using this read address, a cell addressed to a line output port specified by the line identifier is read. In the process, the read address used to access the shared buffer memory 11 becomes idle upon completion of the cell read operation, and therefore is stored in the idle address buffer 103 through the line L33. Also, the next address (pointer address) read simultaneously with the cell from the shared buffer memory 11 is written into the read address memory 102 in order to read the next cell from the queue chain. Each time of the above-mentioned reading operation, the queue chain is compressed by a cell. The detailed operation of the counter 105 and the bandwidth control table 104 will be described later.

Figure 3:
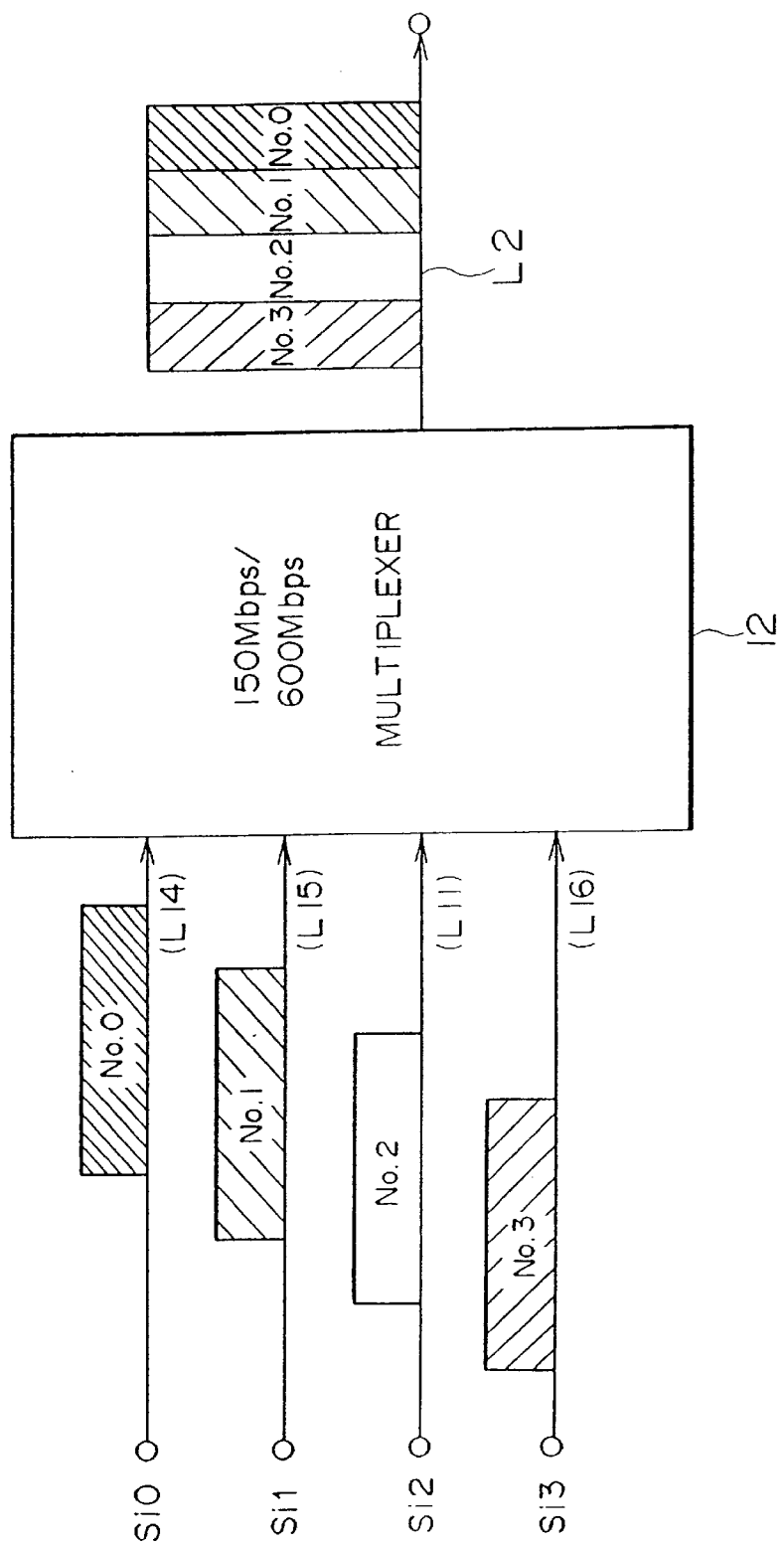
FIG. 3 is a diagram for explaining the operation of a 150 Mbps/600 Mbps multiplexer shown in FIG. 2.

FIG. 3 shows the operation of the multiplexer 12 of 150 Mbps/600 Mbps connected with the switch unit input ports Si0 to Si3. The cells on the switch unit input ports Si0 to Si3 (internal input links L14, L15, L11, L16) have a transmission rate of 150 Mbps and are applied to the multiplexer 12 at slightly different timings from each other. The multiplexer 12 multiplexes the input cells from the input port lines sequentially and outputs them to the line L2 at a transmission rate of 600 Mbps. A similar operation is performed by the 75 Mbps/150 Mbps multiplexer 21 connected to the line input ports Pi2, Pi3 and the 150 Mbps/300 Mbps multiplexer 22 connected to the line output port Po0.

Also, the demultiplexer 13 of 600 Mbps/150 Mbps connected to the switch unit output ports So0 to So3 demultiplexes the input cells in a manner reverse in cell input/output timing of the 150 Mbps/600 Mbps multiplexer 12 shown in FIG. 3. The 300 Mbps/150 Mbps demultiplexer connected to the line input port Pi0 and the 150 Mbps/75 Mbps demultiplexer 23 connected to the line output ports Po2, Po3 also operate the same way as the 600 Mbps/150 f4 bps multiplexer 13. As a result of these operations, the sequence of the cells is maintained in the internal links L10, L2 and L4, L54 respectively.

Figure 4:
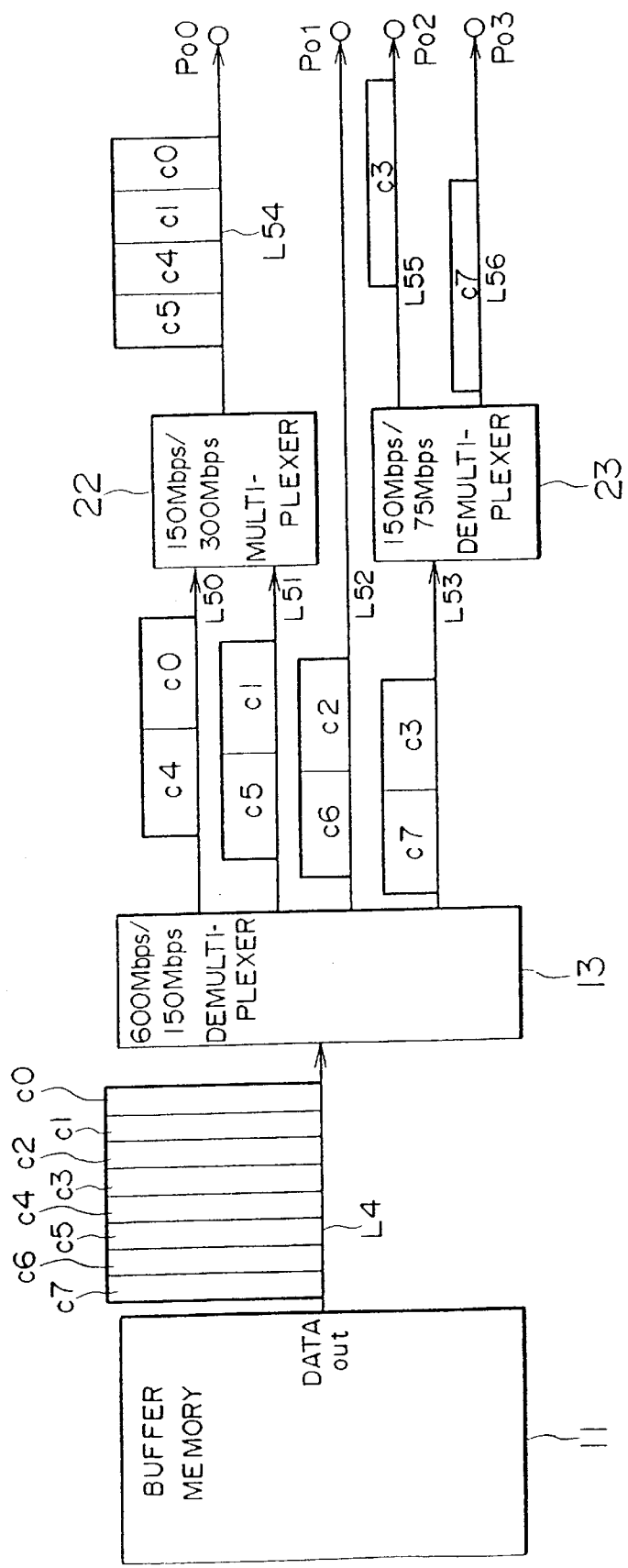
FIG. 4 is a diagram for explaining the operation of switches between a shared buffer memory and an output port.

FIG. 4 shows the correlation between the read cells c0 to c7 from the shared buffer memory 11 to the line output ports (Po0, Pol, Po2, Po3). The cells c0, c1, c3 ..., c7 and so on, read out in that order on the line L4 are demultiplexed into four cell trains at the 600 Mbps/150 Mbps demultiplexer 13. As a result, the cells c0, c4 and so on are transferred in that order on the internal output link L50, c1, c5 and so on, in that order on the internal output link L51, c2, c6 and so on, in that order on the internal output link L52, and c3, c7 and so on, in that order on the internal output link L53. Of all these cells, those on the links L50 and L51 are multiplexed by the 150 Mbps/300 Mbps multiplexer 22 and are outputted to the internal output link L54 as c0, c1, c4, c5 and so on, in that order. Specifically, the sequence of cells is maintained in the internal output links L4 and L54. The cells outputted to the link 53, on the other hand, are demultiplexed further into two cell trains by the 150 Mbps/75 Mbps demultiplexer 23, so that the cells c3 and so on, are outputted on the internal output link L55 and the cells 25 c7 and so on, on the internal output link L56, respectively, at a transmission rate of 75 Mbps.

Figure 5:
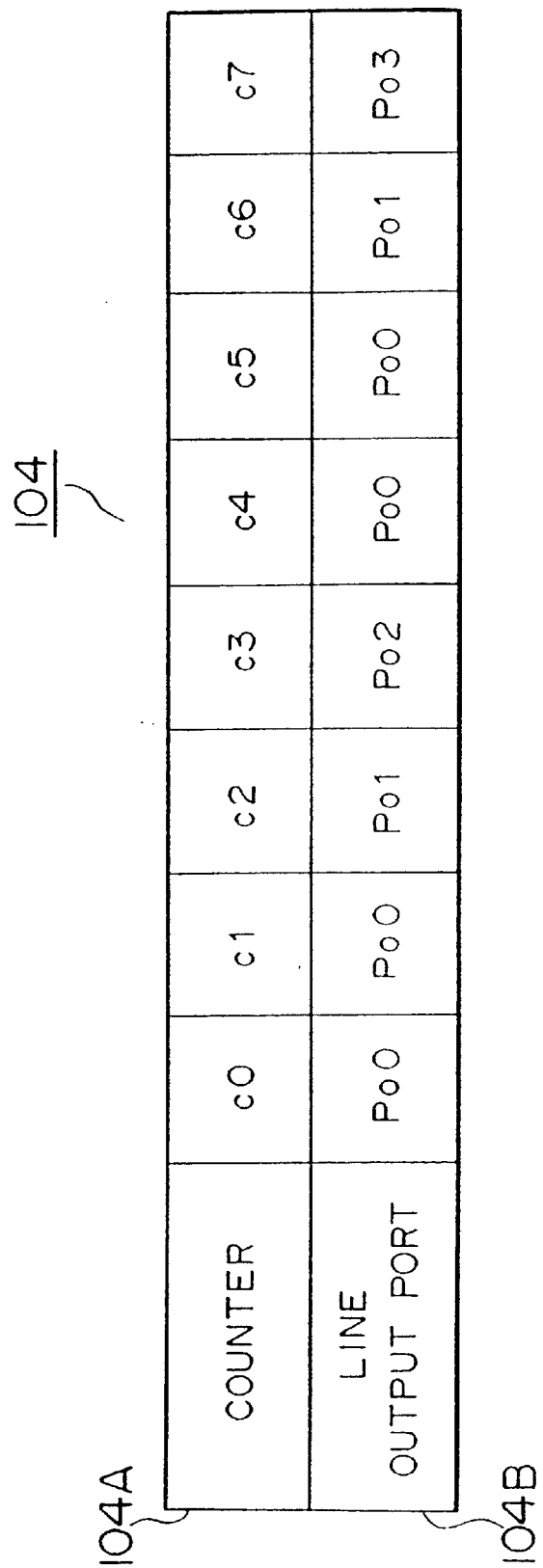
FIG. 5 is a diagram showing the relationship between a counter value and an output port stored in a bandwidth control table.

As described above, according to the present invention, the demultiplexer 13 is adapted to sequentially distribute the cells read from the shared buffer memory 11 among the internal output links L50 to L53. Therefore, the line output ports to which cells are sent are determined by the timing at which cells are outputted from the shared buffer memory 11. According to the present invention, in order to read the cells at an output timing corresponding to the designation line output ports from the shared buffer memory 11, line identifiers Po0 to Po3 are outputted as shown in FIG. 5 from the control table 104 in accordance with the count value of the counter 105 (table address). To facilitate the understanding, the count values (table addresses) in the column 104A are shown with cell codes (output timings) shown in FIG. 4. The line identifiers stored in the column 104B of the control table 104 are addressed in circulation by the count values of the counter 105, so that the output line identifiers Po0, Po0 corresponding to the count values c0, c1 and so on, are outputted at the output timing of c8, c9 and so on, following the cell c7.

Assume that the contents of the control table 104 can be rewritten freely by the control of the processor of a call control unit or another micro-computer not shown, for example. When the multiplexer or demultiplexer for speed change installed in the input/output links is replaced, the speed of each input/output link connected to the switching system can be freely changed by rewriting the values of the output line identifiers in the control table 104 corresponding to the speed change means.

Assume, for example, that the demultiplexer 20 connected to the internal input link 14 in FIG. 1 and the 150 Mbps/300 Mbps multiplexer 22 connected to the internal output link L50 are replaced by a 75 Mbps/150 Mbps multiplexer and a 150 Mbps/75 Mbps demultiplexer respectively. The value of the output line identifier addressed by the count values c0 and c4 in the control table 104 should be changed correspondingly to the 75 Mbps line output port respectively. As a result, each of the links L10 and L54 can be demultiplexed into two input/output links of 75 Mbps respectively.

In the configuration of FIG. 1, when it is desired to reconnect the internal input links L15, L11 to the 300 Mbps/150 Mbps demultiplexer 20, and the 150 Mbps/300 Mbps multiplexer 22 to the internal output links L51, L52, the value of the identifier addressed by the count values c1, c2, c5, c6 of the control table 104 should be made to correspond to the 300 Mbps line output port. As a result, the 300 Mbps input/output link can be accommodated in the ports Pi1, Po1. Although the same number of line ports are installed on the input and output sides of the switching system for assuring the same linking speed of the positionally corresponding input/output ports in FIG. 1, it is not always necessary to insure the same number and arrangement of line ports on input and output sides according to the present invention.

Also, in the case where it is desired to divide the band of the virtual path or virtual channel in the 150 Mbps link L53 completely into 75 Mbps links, the virtual path or channel should be distributed at storage positions addressed by the count values c3, c7 in the control table 104. By operating the values of the line identifier in the control table 104, the 150 Mbps link can be demultiplexed into bands other than mentioned above. It is, however, necessary to change the period of the counter 105.

Figure 6:
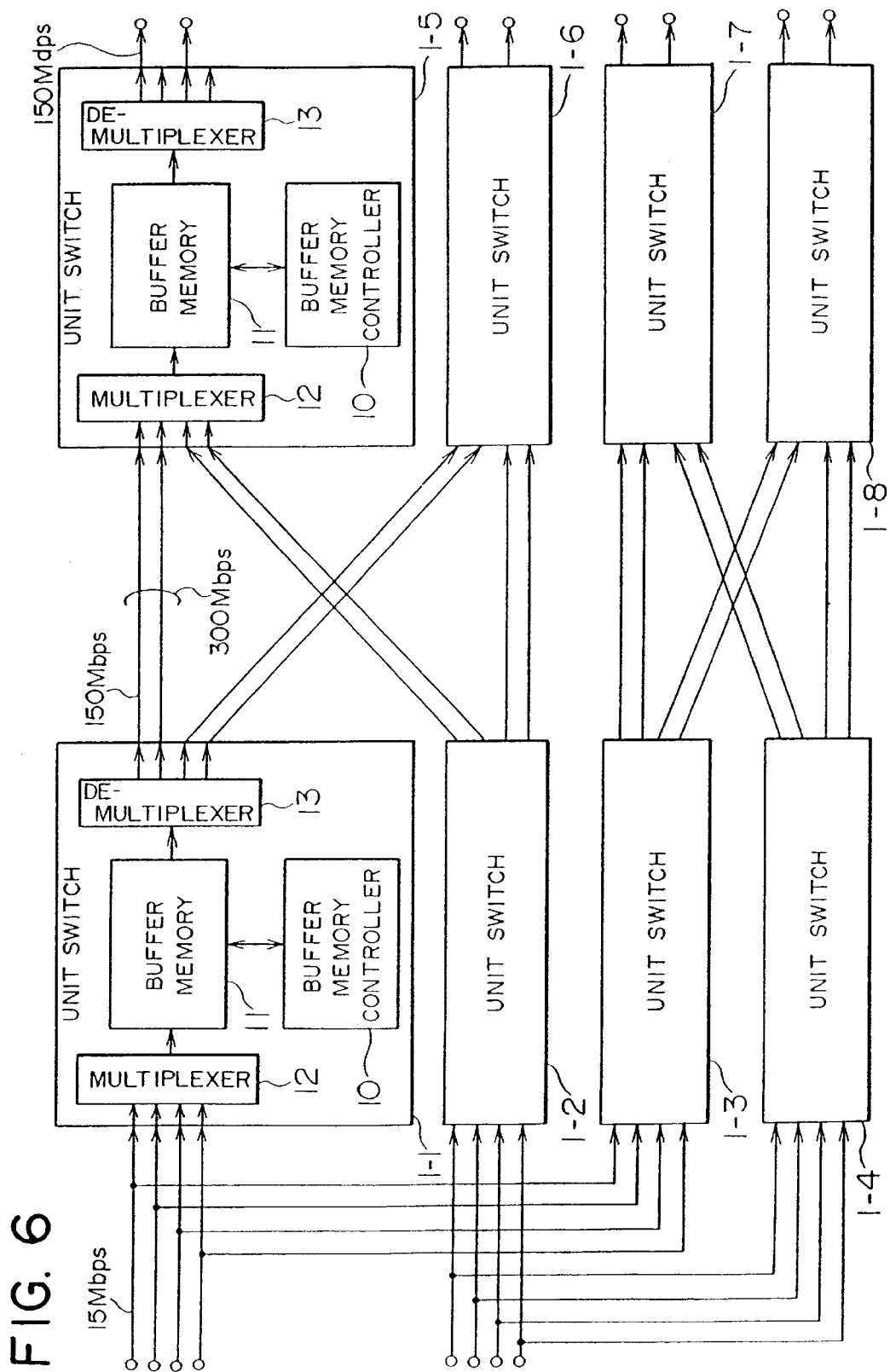
FIG. 6 is a diagram showing an example of configuration of a switch expanded according to the present invention.

FIG. 6 shows an example of switch unit configuration including a plurality of unit switches with 4×4 input/output ports which is enlarged to have 8×8 put/output ports. In this case, there are the four unit switches 1—1 to 1–4 in the front stage and the four unit switches 1–5 to 1–8 in the rear stages the total of switches is 8), and the unit switches 1–5,1–6,1–7 and 1–8 in the rear stage are operated as the ones substantially having 4×2 input/output links with two of the four output links left unused.

The four input ports of the first unit switch 1—1 in the front stage and the four input ports of the third unit switch 1–3 are commonly connected to a 150 Mbps 4 (first to fourth) internal input links.

The unit switch 1—1 is adapted to apply, of all the input cells from the internal input links, only the cells destined for the unit switches 1–5 and 1–6 to the shared buffer memory 11, and in accordance with the port identification information of each cell, distributes the cells among the unit switches in the rear stage. The unit switch 1–3, on the other hand, causes only the input cells destined for the unit switches 1–7 and 1–8 in the rear stage to the shared buffer memory, and distributes these cells among the unit switches in the rear stage.

The unit switches 1–2 and 1–4 in the front stage are commonly connected to the four (fifth to eighth) input links. The unit switch 1–2 receives only the input cells destined for the unit switches 1–5 and 1–6 in the rear stage, and the switch 1–4 only those input cells destined for the unit switches 1–7 and 1–8 in the rear stage, respectively, thereby performing the switching operation in accordance with the port identification information of the cells.

Each of the unit switches 1—1, 1–2, 1–3 and 1–4 in the front stage has four 150 Mbps output ports. Since every unit switch operates to distribute cells among two unit switches in the rear stage, however, the switches in the front stage is theoretically operated as having two 300 Mbps output ports as a whole. In this case, a control table for the unit switches 1—1, 1–2, 1–3 and 1–4 in the front stage is designed on the assumption that there exists a link of 300 Mbps between the switch-groups in the front and rear stages, thereby making it possible to transmit cells with a throughput of 300 Mbps within the switch unit.

Figure 7:
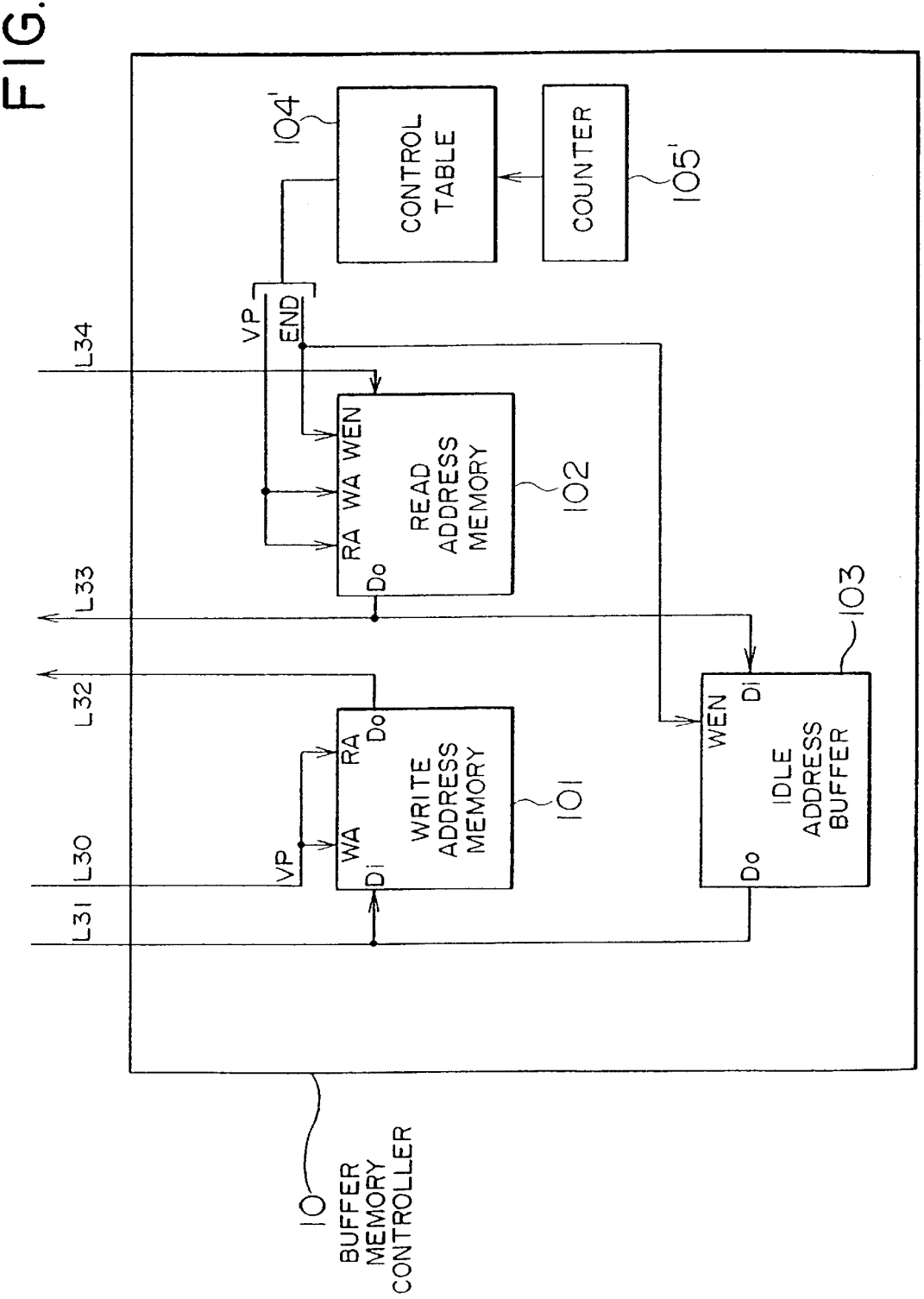
FIG. 7 is a diagram showing an example of configuration of a buffer memory control circuit for realizing the multicast function according to the present invention.
Figure 9:
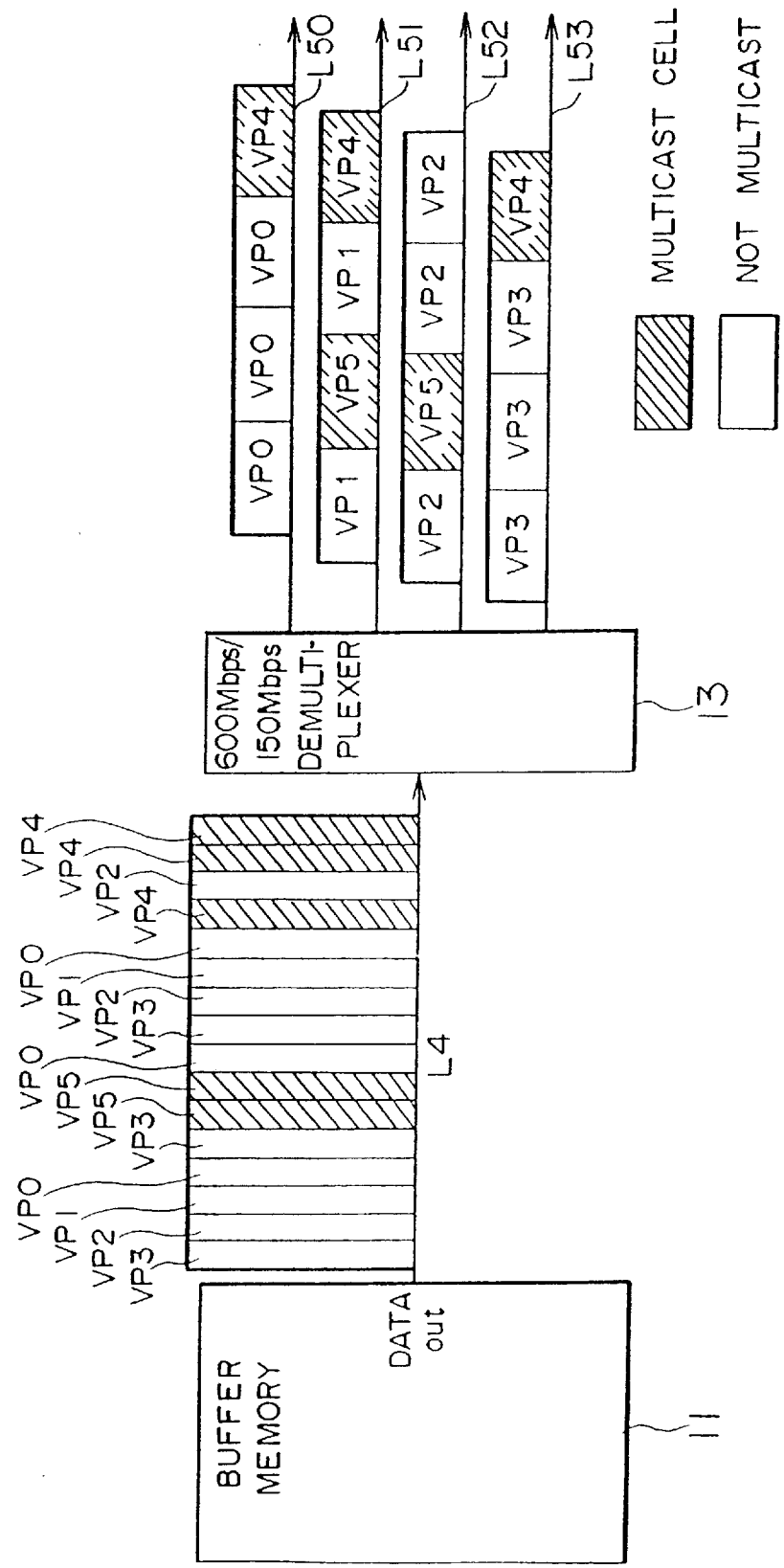
FIG. 9 is a diagram for explaining the operation timing between a shared buffer memory and an output port in a switch having the multicast function.

A second embodiment of the present invention will be explained below with reference to an example of a switching system having the multicast function utilizing a control table as shown in FIGS. 7 to 9.

FIG. 7 is a diagram showing an example of configuration of a buffer memory control circuit 10 for realizing the multicast function. In this example, the write address memory 101 and the read address memory 102 are controlled for each virtual path (VP).

In order to realize the multicast function, it is necessary to read cells to be multicast a plurality of times repetitively from the shared buffer memory 11 and output them to a plurality of output ports to be multicast. More specifically, the same read address is outputted repetitively from the read address memory 102 and continues to be applied to the shared buffer memory 11 until the outputs of the multicast cells are processed for all the output ports to be multicast.

In FIG. 7, the control table 1041 has the function of outputting an END signal for controlling the repetition of the same read address in addition to the virtual path VP for specifying the queue chain to be accessed. In reading a multicast cell, the END signal is held at "0" level until the sample multicast cell is completely read out a required number of times, whereby the addresses in the idle address buffer 103 and the read address memory 102 are updated. Upon completion of the reading of the last read operation and the reading of a non-multicast cell, the END signal is raised to '1' level, whereby the read address memory 102 and the idle address buffer 103 update the address.

FIG. 8 shows an example of the data stored in the control table 1041 for multicasting as mentioned above, and FIG. 9 an operation timing of the cell output from the switch unit 11 in the control table.

In the embodiment of FIG. 8, the line identifiers 104B are shown by the virtual path number. Of all these virtual path numbers, VP0, VP1, VP2 and VP3 are for non-multicast cells, and VP4 and VP5 for multicast cells.

The multicast cells stored in a queue chain corresponding to VP4 are outputted from the buffer memory 11 when the count value (address) 104A is c0, c1, c3. When the count value is c0 or c1, the END signal 104C is '0', and therefore the next address in the read address memory 102 is not updated. As a result, at a timing where the count value becomes c0, c1 or c3, an address designating the same cell in the queue chain corresponding to VP4 is outputted repetitively from the read address memory 102, so that the same cell is outputted repetitively from the shared buffer memory 11. When the count value becomes c3, the END signal is turned to 111, and a new next address is stored in the read Address memory 102. Therefore, a new cell is multicast at the time of reading class of VP4 in the next cycle.

The operation of reading the multicast contained in the queue chain of VP5 for which the count value is read out at the timing of c9, c10 is also performed in the same manner as mentioned above. The cells read out at other timings are non-multicast cells. With regard to these cells, the END signal is always kept at '1' to update the address memory to enable a new cell to be read out in the next cycles each time a cell is read out.

FIG. 9 is a diagram showing the cell output operation from a switch unit with the control table 1041 shown in FIG. 8.

In this case, when the cells read out on the line L4 from the buffer memory 11 at a timing corresponding to the cells c0, c4, c8, c12 in count value are outputted on the internal output link L50, the cells read out at a timing corresponding to the c1, c5, c9, c13 in count value, on the internal output link L51, the cells read out at a timing corresponding to c2, c6, c10, c14 in count value, on the internal output link L52, and the cells read out at a timing corresponding to c3, c7, c11, c15 in count value, on the internal output link L53.

As a result, the cells stored in the queue chain of VP4 are multicast to the lines L50, L51, L53, and the cells of VP5 to the links L51, L52. Also, the cells stored in the queue chain of VP0 are outputted to the link L50, the cells in the queue chain of VP1 to the link L51, the cells in the queue chain of VP2 to the link L52, and the cells in the queue chain of VP3 to the link L53. In this system, it is possible to send out the cells to each link in a completely divided form separating the bands for non-multicast cells and multicast cells without any interference.

Now, explanation will be made about a switching system having the switching function corresponding to the QOS class of the cells according to a third embodiment of the present invention.

Figure 10:
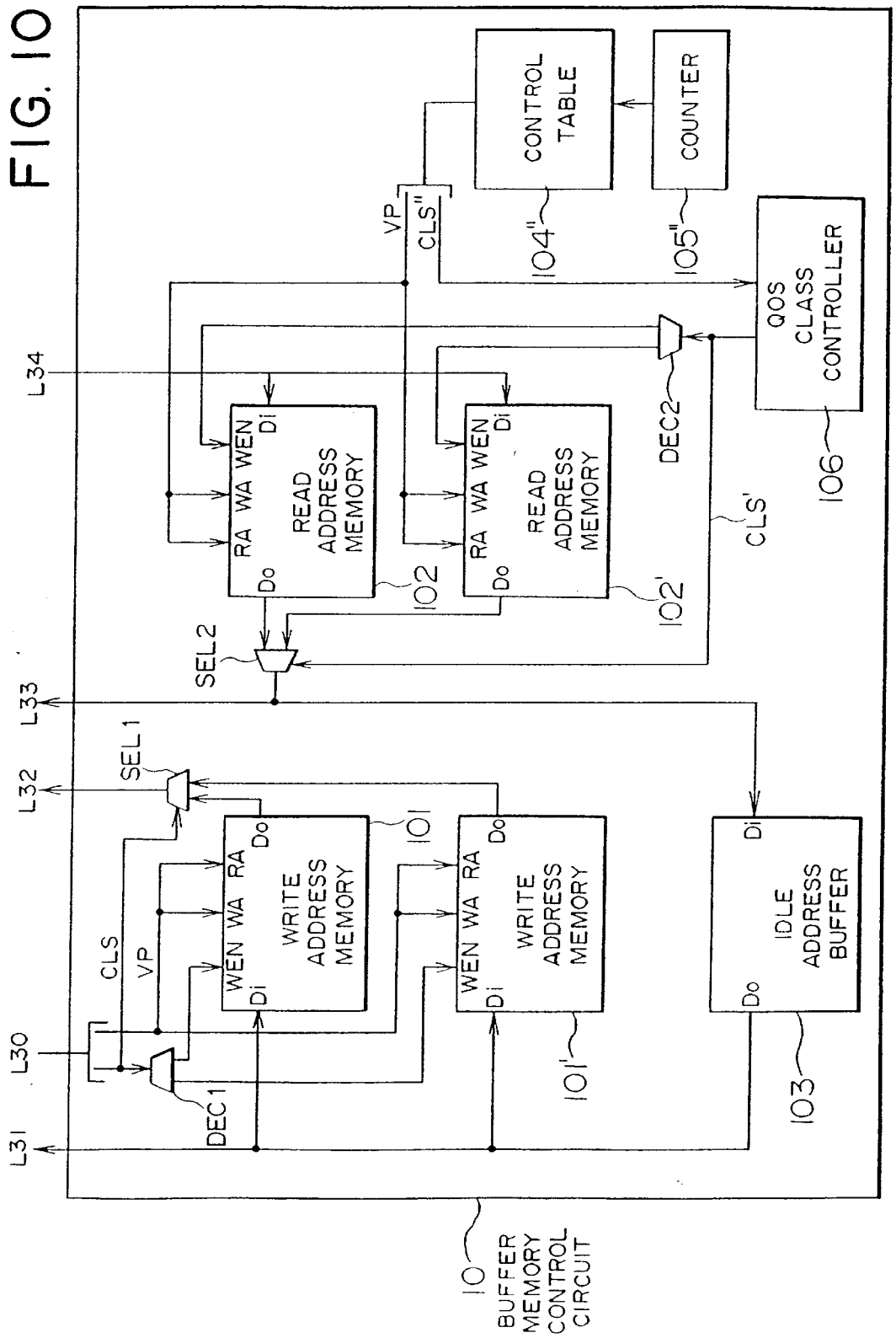
FIG. 10 is a diagram showing an example of configuration of a buffer memory control circuit for realizing the QOS (Quality of Service) class function.

FIG. 10 shows an example of configuration of a buffer memory control circuit 10 having the QOS class control function.

In this example, in order to control two classes of QOS, there are provided two write address memories (101, 101') and two read address memories (102, 102'). Also, an extraction circuit 14 shown in FIG. 2 is adapted to extract the class designating information (CLS) and VP from the input cell header and apply them to the buffer memory control circuit 10 through the line L30.

At the time of writing into the cells of the shared buffer memory 11, the write addresses WA1, WA1' are read out of the write address memories 101, 101' respectively. One of these write addresses WA1, WA1' is selected in accordance with the class (CLS) at a selector SEL1 and is applied through the line L32 to the shared buffer memory 11. In the process, one of the write address memories 101, 101' selected in accordance with the class CLS is set to a writable state (WEN to '1') by an output signal of a decoder DEC1, and a new address value is written on the line L30.

At the time of operation of reading cells from the shared buffer memory 11, the read addresses RA1, RA1' are outputted from the two read address memories 102, 102' with the VP outputted from the control table 104" as an address.

One of the addresses RA1 and RA1' is selected in accordance with the signal CLS" produced from the QOS control circuit 106 at the selector SEL2, and is applied through the line L33 to the shared buffer memory 11. At the same time, the address memory 102 or 102' selected in accordance with the signal CLS' is set to a writable state (WEN in '1' state) by the output signal from the decoder DEC2, thereby storing a new next address value inputted through the line L34.

The QOS class control circuit 106 outputs the signal CLS' in accordance with the CLS" outputted from the control table 104". A different class is selected, however, when there is no cells to be read in the class designated by the output of the control table. By the control mentioned above, the band for each class designated by the control table 1041' is assured, and in the case where a given class cell designated has not yet arrived, the cell of another class can be outputted, thereby making it possible to utilize the band of a QOS class not in use.

In order to determine the presence or absence of cells of designated class in the QOS class control circuit 106, a counter is installed for each VP or class, for instance, to count the number of cells contained presently in the shared buffer memory 11. This method, however, is liable to increase the hardware quantity.

Another method of determining the presence or absence of cells consists in comparing the values of the write address memory 101 (101') and the read address memory 102 (102') with each other in accordance with each VP or class, for instance. The cell absence is determined if the two addresses coincide with each other, and the presence is judged if the two addresses fail to coincide with each other. This method saves the hardware quantity, but requires an appropriate timing in making comparison of addresses with a read address memory in a write address memory, and therefore the setting of the operation timing is stricter.

Figure 11:
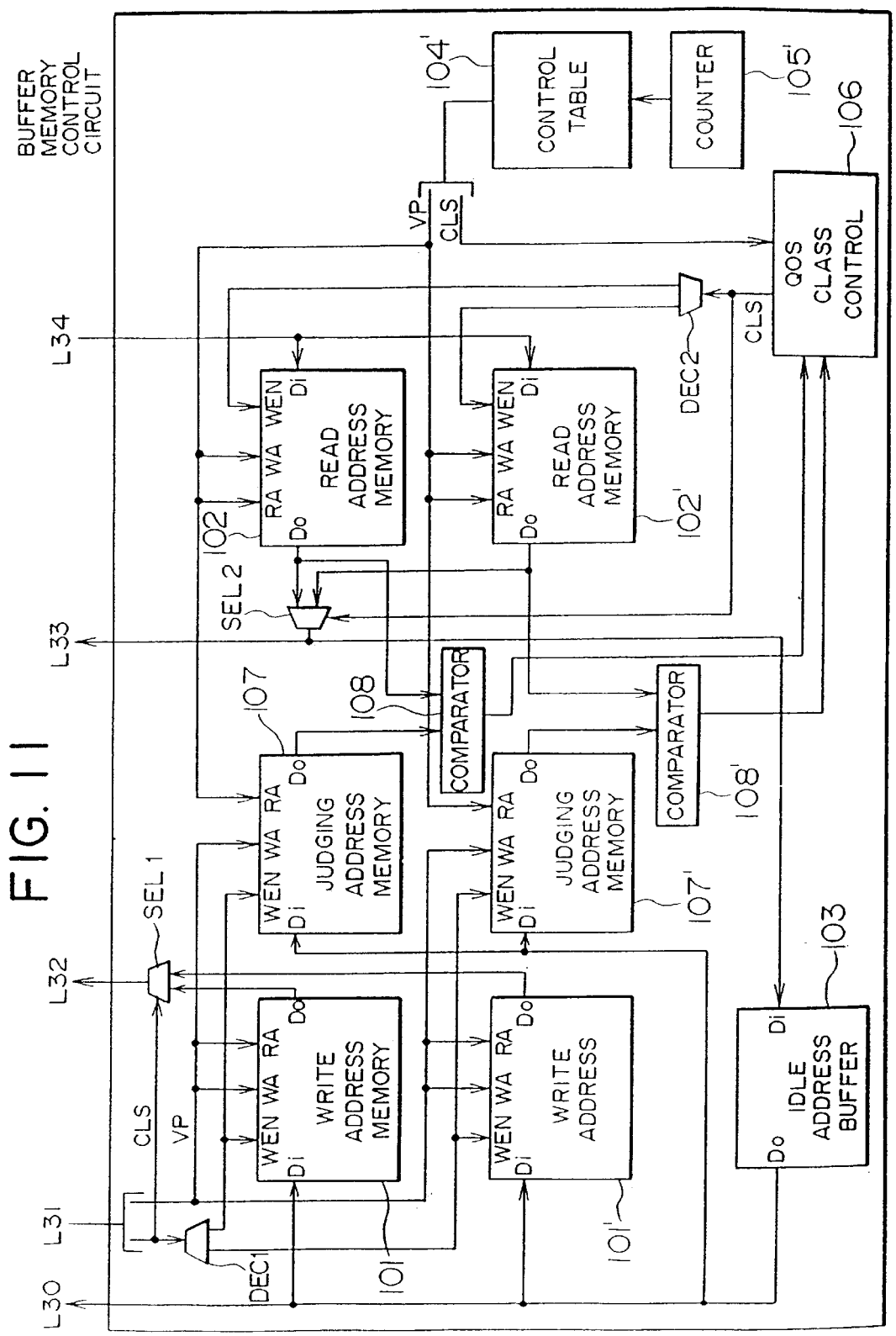
FIG. 11 is a diagram showing a buffer memory control circuit having the QOS function according to another embodiment.

A method for solving this problem lies, as shown in FIG. 11, in installing write address memories 107, 107' for determining the cell presence or absence in the buffer memory control circuit 10. The output addresses of the write address memories 107, 107' for determining the cell presence or absence are applied to comparators 108, 108' together with the output addresses of the read address memories 102, 102', and the results of comparison are applied to the QOS class control circuit 106 as a signal representing the cell presence or absence.

According to this method, there is no need to secure the time for determining the presence or absence of cells in the write address memories 101, 101', and therefore the timing control is facilitated. Also, the hardware addition is comparatively saved because the additional necessary equipment include only the write address memories 107, 107' and the comparators 108, 108'.

As apparent from the foregoing explanation, according to the present invention, there is provided an ATM switch unit comprising a plurality of output ports having the same transmission rate, in which a buffer memory control circuit includes a control table, and a cell queue chain to be read by the control table is designated in accordance with the timing of cell output to each switch unit output port in circulation. As a result, the interposition of a plurality of switch unit output ports having a plurality of lines and a single line port make it possible to increase the transmission rate of the output lines, while the transmission rate of the output line can be reduced by inserting a demultiplexer between a single switch unit output port and a plurality of line ports, with the result that a plurality of types of output lines having different transmission rates can be easily accommodated in a switching system. An ATM switching system having output links of 150 Mbps in transmission rate, for instance, is capable of housing output lines of 600 Mbps if equipped with a quadruple multiplexer.

Further, according to the present invention, information for designating whether the same cell is to be read at the next reading operation, for example, may be set in a control table in addition to a line identifier for designating a queue chain for reading cells thereby to realize the multicast function controlled in band.

Furthermore, according to the present invention, there is provided a buffer memory control circuit in which a write address memory and a read address memory are disposed in a relation corresponding to the QOS class of cells, so that a QOS class is designated by a control table, thereby realizing the communications with a band assured for each QOS class.

What is claimed is:

1. A switching system analyzing a destination of information included in a plurality of fixed-length packets and transferring said fixed-length packets from one of a plurality of input ports to one of a plurality of output ports based on the analyzing, comprising:

a first memory storing said received fixed-length packets from one of said plurality of input ports to be transferred to one of said plurality of output ports;

a second memory storing managing information for managing write and read addresses of said first memory; and a controller, provided commonly in said first memory and said second memory, controlling writing in and reading out of said fixed-length packets for said first memory and writing of said fixed-length packet being carried out by supplying an address of said first memory to said first memory based on said managing information received from said second memory, said reading of said fixed-length packet being carried out by supplying an address stored in the writing of said fixed-length packet to said first memory, and inputting managing information corresponding to said stored address used for said reading to said second memory.

2. A switching system according to claim 1, wherein said first memory is constructed of a plurality of memory blocks.

3. A switching system analyzing a destination of information included in a plurality of fixed-length packets and transferring said fixed-length packets from one of a plurality of input ports to one of a plurality of output ports based on the analyzing, comprising:

a first memory storing said received fixed-length packets from one of said plurality of input ports to be transferred to one of said plurality of output ports;

a second memory storing information corresponding to an idle address of said first memory; and a controller, provided commonly in said first memory and said second memory, controlling writing in and reading out of said fixed-length packets for said first memory and writing in and reading out of said information for said second memory, the writing of said fixed-length packet being carried out by supplying an address of said first memory to said first memory based on said information received from said second memory, said reading of said fixed-length packet being carried out by supplying an address stored in the writing of said fixed-length packet to said first memory, and inputting information corresponding to said stored address used for said reading to said second memory.

4. A switching system according to claim 3, wherein said first memory is constructed of a plurality of memory blocks.

5. A switching system analyzing a destination of information included in a plurality of fixed-length packets and transferring said fixed-length packets from one of a plurality of input ports to one of a plurality of output ports based on the analyzing, comprising:

a first memory storing said received fixed-length packets from one of said plurality of input ports to be transferred to one of said plurality of output ports;

a second memory storing managing information for managing write and read addresses of said first memory; and a controller, connected to said first and second memories, controlling writing in and reading out of said fixed-length packets for said first memory and writing in and reading out of said managing information for said second memory, wherein when writing the fixed-length packets, a queue for storing the write address of said first memory produced in accordance with information fetched out from said second memory is produced for each destination of the fixed-length packets, and wherein, when reading out the fixed-length packets, a read is conducted by supplying the write address fetched out from said queue to said first memory to which information is to be input corresponding to an address used in the read of said second memory.

6. A switching system analyzing a destination of information included in a plurality of fixed-length packets and transferring said fixed-length packets from one of a plurality of input ports to one of a plurality of output ports based on the analyzing, comprising:

a first memory storing said received fixed-length packets from one of said plurality of input ports to be transferred to one of said plurality of output ports;

a second memory storing managing information for managing write and read addresses of said first memory; and a controller, provided commonly in said first memory and said second memory controlling writing in and reading out of said fixed-length packets for said first memory and writing in and reading out of said managing information for said second memory, the writing of said fixed-length packet being carried out by supplying an address of said first memory to said first memory based on said managing information received from said second memory, said reading of said fixed-length packet being carried out by supplying an address stored in the writing of said fixed-length packet to said first memory, and inputting managing information corresponding to said stored address used for said reading to said second memory.

* * * * *

UNITED STATES PATENT AND TRADEMARK OFFICE
CERTIFICATE OF CORRECTION

| | |
|---|---|
| PATENT NO. | : 6,728,242 B2 |
| APPLICATION NO. | : 10/374998 |
| DATED | : April 27, 2004 |
| INVENTOR(S) | : Y. Sakurai et al. |

It is certified that error appears in the above-identified patent and that said Letters Patent is hereby corrected as shown below:

On Title Page (63) replace as follows

-- (63) Continuation of application Serial No. 09/804,225, filed March 13, 2001, now U.S. Patent No. 6,546,011; which is a continuation of application Serial No. 09/228,748, filed January 12, 1999, now U.S. Patent No. 6,285,675; which is a continuation of application Serial No. 08/462,269, filed June 5, 1005, now U.S. Patent No. 6,016,317; which is a continuation of application Serial No. 08/306,978, filed September 16, 1994, now U.S. Patent No. 5,799,014; which is a continuation of application Serial No. 07/845,668, filed March 4, 1992, now U.S. Patent No. 5,365,519; which is the subject of Reissue application Serial No. 08/430,802, filed April 26, 1995, now RE 36,751; which is a continuation-in-part of application Serial No. 07/482,090, filed February 20, 1990, now U.S. Patent No. 5,124,977; which is the subject of Reissue application Serial No. 08/430,809, filed April 26, 1995; now RE 36,716; which is continuation-in-part of application Serial No. 07/218,217, filed July 13, 1988 which issued as U.S. Patent No. 4,910,731; which reissued as Reissue Patent No. RE 34,305; said application Serial No. 07/485,668, filed March 4, 1992, now U.S. Patent No. 5,365,519 is a continuation-in-part of application Serial No. 07/745,466, filed August 14, 1991, now U.S. Patent No. 5,280,475--

UNITED STATES PATENT AND TRADEMARK OFFICE
CERTIFICATE OF CORRECTION

PATENT NO. : 6,728,242 B2
APPLICATION NO. : 10/374998
DATED : April 27, 2004
INVENTOR(S) : Y. Sakurai et al.

It is certified that error appears in the above-identified patent and that said Letters Patent is hereby corrected as shown below:

Insert on Title Page as follows

--(30)    Foreign Application Priority Data

Jul. 15, 1987   (JP)................62-174603
        Oct. 9, 1987    (JP)................62-253661
        Nov. 11, 1987   (JP)..............62-283249
        Apr. 27, 1988   (JP)...............63-102512
        Feb. 22, 1989   (JP)...............01-040230
        Aug. 17, 1990   (JP...............02-215705
        Mar. 5, 1991    (JP)................03-038388--

Signed and Sealed this

Twenty-seventh Day of February, 2007

JON W. DUDAS
*Director of the United States Patent and Trademark Office*